US012806998B2

(12) United States Patent
Xia et al.

(10) Patent No.: US 12,806,998 B2
(45) Date of Patent: Nov. 24, 2026

(54) AUGMENTED REALITY INFORMATION OVERLAY WITH GAZE TRACKING

(71) Applicants: GM Global Technology Operations LLC, Detroit, MI (US); University of Southern California, Los Angeles, CA (US)

(72) Inventors: Chunyu Xia, Los Angeles, CA (US); Ramesh Govindan, Cerritos, CA (US); Chuan Li, Troy, MI (US); Harsha Madhyastha, Cerritos, CA (US); Fan Bai, Ann Arbor, MI (US); Christina Shin, Irvine, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/966,921

(22) Filed: Dec. 3, 2024

(65) Prior Publication Data

US 2026/0152065 A1 Jun. 4, 2026

(51) Int. Cl.
*B60K 35/28* (2024.01)
*B60K 35/235* (2024.01)
*G06T 7/70* (2017.01)

(52) U.S. Cl.
CPC ............ *B60K 35/28* (2024.01); *B60K 35/235* (2024.01); *G06T 7/70* (2017.01); *B60K 2360/149* (2024.01); *B60K 2360/176* (2024.01); *B60K 2360/177* (2024.01);
(Continued)

(58) Field of Classification Search
CPC .. G06V 10/764; G06V 20/597; G06V 20/647; G06V 40/171; G06V 40/193; G06V 20/582; G01C 21/3644; G01C 21/3602
See application file for complete search history.

(56) References Cited

U.S. PATENT DOCUMENTS

| | | | | |
|---|---|---|---|---|
| 2020/0349368 | A1* | 11/2020 | Mayster | G01C 21/3644 |
| 2020/0401823 | A1* | 12/2020 | Miller | G06N 3/08 |
| 2021/0182625 | A1* | 6/2021 | Arar | G06N 3/08 |

OTHER PUBLICATIONS

Ester, M., et al. "A Density-Based Algorithm for Discovering Clusters in Large Spatial Databases with Noise," Proceedings of the Second International Conference on Knowledge Discovery and Data Mining, 1996, pp. 226-231.

(Continued)

*Primary Examiner* — Erin M Piateski
*Assistant Examiner* — John C Merino
(74) *Attorney, Agent, or Firm* — Vivacqua Crane, PLLC

(57) ABSTRACT

A method for displaying information to an occupant of a vehicle may include generating a three-dimensional (3D) map of an environment surrounding the vehicle. The 3D map includes a plurality of 3D bounding boxes. Each of the plurality of 3D bounding boxes corresponds to one of a plurality of landmarks. The method further may include determining a pose of a vehicle camera. The method further may include determining a gaze vector of the occupant of the vehicle. The method further may include determining a selected landmark of the plurality of landmarks based at least in part on the plurality of 3D bounding boxes, the pose of the vehicle camera, and the gaze vector of the occupant. The method further may include displaying information about the selected landmark to the occupant using a display.

14 Claims, 7 Drawing Sheets

(52) U.S. Cl.
CPC ............... *G06T 2207/10028* (2013.01); *G06T 2207/30244* (2013.01); *G06T 2207/30252* (2013.01)

(56) References Cited

OTHER PUBLICATIONS

Özyeşil, O., et al. "A survey of structure from motion," Acta Numerica, vol. 26, 2017, pp. 305-364.
Wetzel, J., "Image Based 6-DOF Camera Pose Estimation with Weighted RANSAC 3D," Fraunhofer Institute of Optronics, System Technologies, and Image Exploitation, 2013, pp. 1-6.
Zhang, X., et al., "MPIIGaze: Real-World Dataset and Deep Appearance-Based Gaze Estimation," IEEE Transactions on Pattern Analysis and Machine Intelligence, 2017, pp. 1-14.

* cited by examiner

AUGMENTED REALITY INFORMATION OVERLAY WITH GAZE TRACKING

GOVERNMENT FUNDING

This invention was made with government support under CNS1956445 awarded by the National Science Foundation. The government has certain rights in the invention.

INTRODUCTION

The present disclosure relates to systems and methods for displaying information to vehicle occupants.

To provide information in vehicle applications, various display systems may be utilized. Display systems may be configured to present information such as, for example, speed, navigation instructions, system diagnostics, entertainment options, and/or the like. In some examples, display systems are configured as touchscreens with integrated haptic feedback, allowing for intuitive user interaction. Display systems may include additional features, such as adaptive brightness controls to enhance visibility in various lighting conditions, voice command integration to enable hands-free operation, and head-up display technology. Display may also support wireless communication protocols, allowing them to interface with mobile devices, cloud services, and other vehicle systems. Display systems may use wireless communication to retrieve information from external sources (e.g., the internet) for display to the vehicle occupants. For example, display systems may be used to provide vehicle occupants with information about conditions outside of the vehicle, including, for example, weather conditions, traffic conditions, point of interest or destination information, and/or the like.

While systems and methods for displaying information achieve their intended purpose, there is a need for new and improved systems and methods for providing information to vehicle occupants.

SUMMARY

According to several aspects, a method for displaying information to an occupant of a vehicle is provided. The method may include generating a three-dimensional (3D) map of an environment surrounding the vehicle. The 3D map includes a plurality of 3D bounding boxes. Each of the plurality of 3D bounding boxes corresponds to one of a plurality of landmarks. The method further may include determining a pose of a vehicle camera based at least in part on one or more camera images of an environment surrounding the vehicle captured using the vehicle camera. The method further may include determining a gaze vector of the occupant of the vehicle. The method further may include determining a selected landmark of the plurality of landmarks based at least in part on the plurality of 3D bounding boxes, the pose of the vehicle camera, and the gaze vector of the occupant. The method further may include displaying information about the selected landmark to the occupant using a display.

In another aspect of the present disclosure, generating the 3D map further may include generating a 3D point cloud including a plurality of 3D points based on a plurality of reference images including the plurality of landmarks. Each of the plurality of 3D points is defined by a 3D point feature vector. Generating the 3D map further may include determining each of the plurality of 3D bounding boxes by clustering the 3D point cloud into a plurality of point cloud clusters.

In another aspect of the present disclosure, clustering the 3D point cloud further may include generating the plurality of point cloud clusters using a density-based spatial clustering of applications with noise (DBSCAN) algorithm. Clustering the 3D point cloud further may include filtering the plurality of point cloud clusters to generate a plurality of filtered point cloud clusters. Each of the plurality of filtered point cloud clusters corresponds to one of the plurality of landmarks.

In another aspect of the present disclosure, filtering the plurality of point cloud clusters further may include splitting one or more of the plurality of point cloud clusters to generate a plurality of split point cloud clusters. Each of the plurality of split point cloud clusters corresponds to only one of the plurality of landmarks. The plurality of filtered point cloud clusters includes the plurality of split point cloud clusters.

In another aspect of the present disclosure, filtering the plurality of point cloud clusters further may include determining two or more of the plurality of split point cloud clusters to correspond to a same one of the plurality of landmarks based at least in part on at least one of: a relative size of the two or more of the plurality of split point cloud clusters and a distance between the two or more of the plurality of split point cloud clusters.

In another aspect of the present disclosure, determining the pose of the vehicle camera further may include capturing the one or more camera images using the vehicle camera. Determining the pose of the vehicle camera further may include detecting one or more detected landmarks of the plurality of landmarks in the one or more camera images. Detecting the one or more detected landmarks further may include identifying a plurality of 2D points within each of the one or more detected landmarks in the one or more camera images and determining a 2D point feature vector for each of the plurality of 2D points. Determining the pose of the vehicle camera further may include determining the pose of the vehicle camera based at least in part on matching one or more of the one or more detected landmarks to one or more of the plurality of 3D bounding boxes.

In another aspect of the present disclosure, determining the pose of the vehicle camera further may include identifying a plurality of corresponding points between one or more of the plurality of 3D points and one or more of the plurality of 2D points based at least in part on the 3D point feature vector of each of the plurality of 3D points and the 2D point feature vector of each of the plurality of 2D points. Each of the plurality of corresponding points is located within one of the plurality of 3D bounding boxes. Determining the pose of the vehicle camera further may include determining the pose of the vehicle camera using a perspective-n-point (PnP) algorithm and a random sample consensus (RANSAC) algorithm based at least in part on the plurality of corresponding points. The pose of the vehicle camera is defined with six degrees of freedom (DoF).

In another aspect of the present disclosure, determining the selected landmark further may include determining a projected gaze based at least in part on the gaze vector of the occupant. Determining the selected landmark further may include identifying one or more collisions between the projected gaze and one or more of the plurality of 3D bounding boxes. Determining the selected landmark further may include determining the selected landmark based at least in part on the one or more collisions.

In another aspect of the present disclosure, determining the projected gaze and identifying the one or more collisions further may include determining the projected gaze. The projected gaze further includes a gaze cone defined by a gaze cone angle. A longitudinal axis of the gaze cone is coincident with the gaze vector. Determining the projected gaze and identifying the one or more collisions further may include identifying the one or more collisions between the gaze cone and one or more of the plurality of 3D bounding boxes.

In another aspect of the present disclosure, determining the selected landmark further may include determining a view frustum of the occupant based at least in part on the gaze vector of the occupant, the pose of the vehicle camera, and the plurality of 3D bounding boxes. The view frustum includes a 2D projection of the gaze vector and a 2D projection of the plurality of 3D bounding boxes. Determining the selected landmark further may include determining the selected landmark based at least in part on a distance between the 2D projection of the gaze vector and the 2D projection of each of the plurality of 3D bounding boxes.

According to several aspects, a system for displaying information to an occupant of a vehicle is provided. The system may include a vehicle camera, an occupant monitoring system (OMS), an augmented reality (AR) display system, and a vehicle controller in electrical communication with the vehicle camera, the OMS, and the AR display system. The vehicle controller is programmed to capture one or more camera images of an environment surrounding the vehicle using the vehicle camera. The vehicle controller is further programmed to determine a pose of a vehicle camera based at least in part on the one or more camera images. The vehicle controller is further programmed to determine a gaze vector of the occupant of the vehicle using the OMS. The vehicle controller is further programmed to determine a selected landmark of a plurality of landmarks in the environment surrounding the vehicle based at least in part on the pose of the vehicle camera, the gaze vector of the occupant, and a three-dimensional (3D) map of the environment surrounding the vehicle. The 3D map includes a plurality of 3D bounding boxes. Each of the plurality of 3D bounding boxes corresponds to one of the plurality of landmarks. The vehicle controller is further programmed to display information about the selected landmark to the occupant using the AR display system.

In another aspect of the present disclosure, to determine the pose of the vehicle camera, the vehicle controller is further programmed to detect one or more detected landmarks of the plurality of landmarks in the one or more camera images. To determine the pose of the vehicle camera, the vehicle controller is further programmed to determine the pose of the vehicle camera based at least in part on matching one or more of the one or more detected landmarks to one or more of the plurality of 3D bounding boxes.

In another aspect of the present disclosure, to determine the pose of the vehicle camera, the vehicle controller is further programmed to identify a plurality of 2D points within each of the one or more detected landmarks in the one or more camera images. To determine the pose of the vehicle camera, the vehicle controller is further programmed to determine a 2D point feature vector for each of the plurality of 2D points. To determine the pose of the vehicle camera, the vehicle controller is further programmed to identify a plurality of corresponding points between one or more of a plurality of 3D points of the 3D map and one or more of the plurality of 2D points based at least in part on a 3D point feature vector of each of the plurality of 3D points and the 2D point feature vector of each of the plurality of 2D points. Each of the plurality of corresponding points is located within one of the plurality of 3D bounding boxes. To determine the pose of the vehicle camera, the vehicle controller is further programmed to determine the pose of the vehicle camera based at least in part on the plurality of corresponding points.

In another aspect of the present disclosure, to determine the selected landmark, the vehicle controller is further programmed to determine a projected gaze based at least in part on the gaze vector of the occupant. To determine the selected landmark, the vehicle controller is further programmed to identify one or more collisions between the projected gaze and one or more of the plurality of 3D bounding boxes. To determine the selected landmark, the vehicle controller is further programmed to determine the selected landmark based at least in part on the one or more collisions.

In another aspect of the present disclosure, to determine the projected gaze and identify the one or more collisions, the vehicle controller is further programmed to determine the projected gaze. The projected gaze further includes a gaze cone defined by a gaze cone angle. A longitudinal axis of the gaze cone is coincident with the gaze vector. To determine the projected gaze and identify the one or more collisions, the vehicle controller is further programmed to identify the one or more collisions between the gaze cone and one or more of the plurality of 3D bounding boxes.

In another aspect of the present disclosure, to determine the selected landmark, the vehicle controller is further programmed to determine a view frustum of the occupant based at least in part on the gaze vector of the occupant, the pose of the vehicle camera, and the plurality of 3D bounding boxes. The view frustum includes a 2D projection of the gaze vector and a 2D projection of the plurality of 3D bounding boxes. To determine the selected landmark, the vehicle controller is further programmed to determine the selected landmark based at least in part on a distance between the 2D projection of the gaze vector and the 2D projection of each of the plurality of 3D bounding boxes.

In another aspect of the present disclosure, to determine the selected landmark, the vehicle controller is further programmed to determine a view frustum of the occupant based at least in part on the gaze vector of the occupant, the pose of the vehicle camera, and the plurality of 3D bounding boxes. The view frustum includes a 2D projection of the gaze vector and a 2D projection of the plurality of 3D bounding boxes. To determine the selected landmark, the vehicle controller is further programmed to determine the selected landmark based at least in part on an area of the 2D projection of each of the plurality of 3D bounding boxes.

According to several aspects, a method for displaying information to an occupant of a vehicle is provided. The method may include capturing one or more camera images using a vehicle camera. The method further may include detecting one or more detected landmarks of a plurality of landmarks in the one or more camera images. The method further may include determining a pose of a vehicle camera based at least in part on one or more camera images of an environment surrounding the vehicle captured using the vehicle camera and a three-dimensional (3D) map of the environment surrounding the vehicle. The method further may include determining a gaze vector of the occupant of the vehicle. The method further may include determining a selected landmark of the plurality of landmarks based at least in part on the 3D map, the pose of the vehicle camera, and the gaze vector of the occupant. The method further may include displaying information about the selected landmark to the occupant using an augmented reality (AR) display system.

In another aspect of the present disclosure, determining the pose of the vehicle camera further may include identifying a plurality of 2D points within each of the one or more detected landmarks in the one or more camera images. Determining the pose of the vehicle camera further may include determining a 2D point feature vector for each of the plurality of 2D points. Determining the pose of the vehicle camera further may include identifying a plurality of corresponding points between one or more of a plurality of 3D points of the 3D map and one or more of the plurality of 2D points based at least in part on a 3D point feature vector of each of the plurality of 3D points and the 2D point feature vector of each of the plurality of 2D points. Determining the pose of the vehicle camera further may include determining the pose of the vehicle camera using a perspective-n-point (PnP) algorithm and a random sample consensus (RANSAC) algorithm based at least in part on the plurality of corresponding points. The pose of the vehicle camera is defined with six degrees of freedom (DoF).

In another aspect of the present disclosure, determining the selected landmark further may include determining a projected gaze. The projected gaze includes a gaze cone defined by a gaze cone angle, and where a longitudinal axis of the gaze cone is coincident with the gaze vector. Determining the selected landmark further may include identifying one or more collisions between the gaze cone and one or more of a plurality of 3D bounding boxes of the 3D map. Each of the plurality of 3D bounding boxes corresponds to one of the plurality of landmarks. Determining the selected landmark further may include determining the selected landmark based at least in part on the one or more collisions.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, vehicle occupants may desire to receive information about landmarks and/or points of interest in the environment surrounding the vehicle. The present disclosure provides a new and improved system and method for displaying information to vehicle occupants with minimum occupant interaction and minimal disruption to the driving task or passenger experience.

Figure 1:
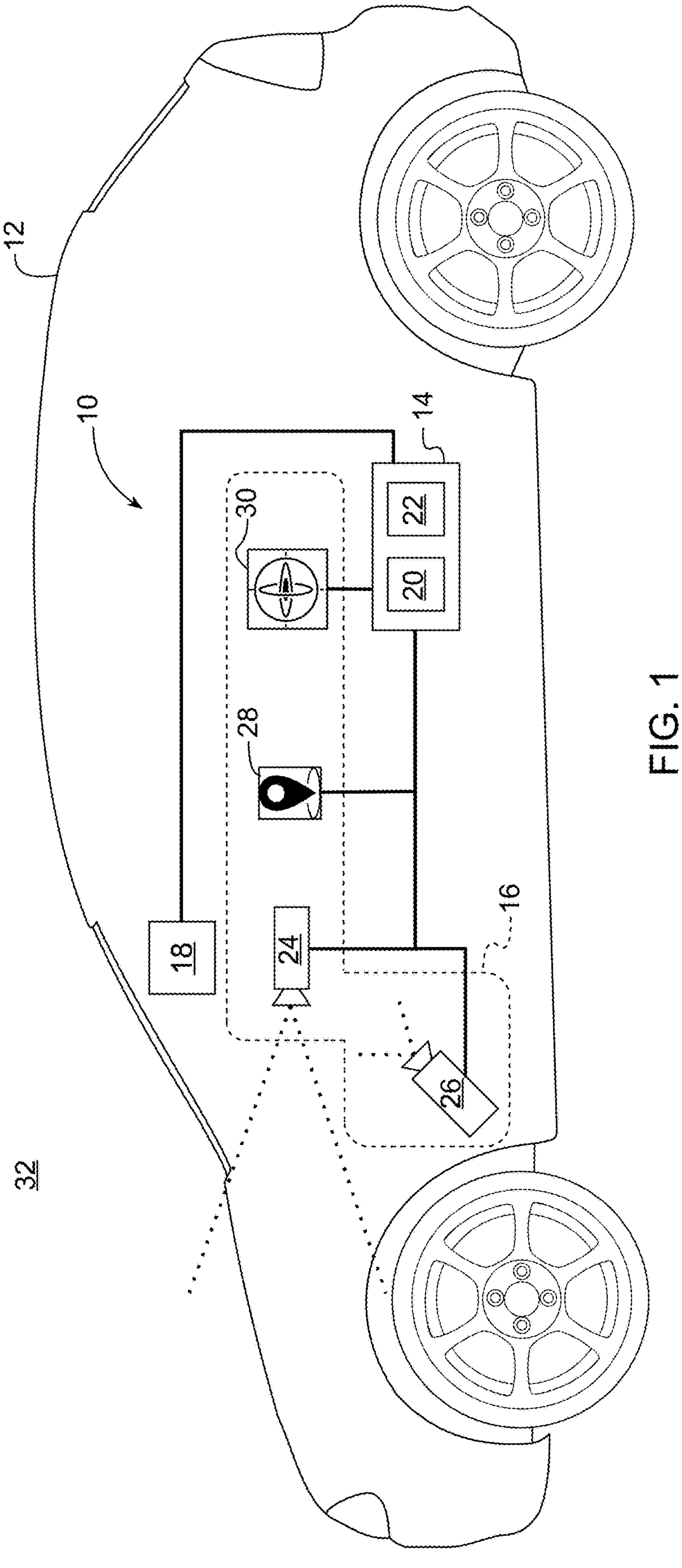
FIG. 1 is a block diagram of a system for displaying information to an occupant of a vehicle, according to an exemplary embodiment.

Referring to FIG. 1, a system for displaying information to an occupant of a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure, including, for example, an autonomous vehicle. The system 10 generally includes a vehicle controller 14, a plurality of vehicle sensors 16, and a display 18.

The vehicle controller 14 is used to implement a method 100 for displaying information to an occupant of a vehicle, as will be described below. The vehicle controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions.

The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12.

The vehicle controller 14 may also include multiple controllers which are in electrical communication with each other. The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with the plurality of vehicle sensors 16 and the display 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 14 are within the scope of the present disclosure. It should further be understood that, in the scope of the present disclosure, electrical communication also includes power and/or energy transfer between electrical devices (e.g., using conducting wires and/or wireless power transmission techniques).

The plurality of vehicle sensors 16 are used to acquire information relevant to the vehicle 12. In an exemplary embodiment, the plurality of vehicle sensors 16 includes at least a vehicle camera 24 and an occupant monitoring system (OMS) 26. In another exemplary embodiment, the plurality of vehicle sensors 16 further includes a global navigation satellite system (GNSS) 28 and/or an inertial measurement unit (IMU) 30.

In another exemplary embodiment, the plurality of vehicle sensors 16 further includes sensors to determine performance data about the vehicle 12. In a non-limiting example, the plurality of vehicle sensors 16 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 16 further includes sensors to determine information about an environment within the vehicle 12. In a non-limiting example, the plurality of vehicle sensors 16 further includes at least one of a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about an environment 32 surrounding the vehicle 12. In a non-limiting example, the plurality of vehicle sensors 16 further includes at least one of an ambient air temperature sensor, a barometric pressure sensor, and/or a photo and/or video camera which is positioned to view the environment 32 in front of the vehicle 12.

In another exemplary embodiment, at least one of the plurality of vehicle sensors 16 is a perception sensor capable of perceiving objects and/or measuring distances in the environment 32 surrounding the vehicle 12. In a non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen of the vehicle 12. In another example, at least one of the plurality of vehicle sensors 16 is affixed outside of the vehicle 12, for example, on a roof of the vehicle 12, having a view of the environment 32 surrounding the vehicle 12. It should be understood that various additional types of perception sensors, such as, for example, LiDAR sensors, ultrasonic ranging sensors, radar sensors, and/or time-of-flight sensors are within the scope of the present disclosure. The plurality of vehicle sensors 16 are in electrical communication with the vehicle controller 14 as discussed above.

The vehicle camera 24 is a perception sensor used to capture images and/or videos of the environment 32 surrounding the vehicle 12. In an exemplary embodiment, the vehicle camera 24 includes a photo and/or video camera which is positioned to view the environment 32 surrounding the vehicle 12. In a non-limiting example, the vehicle camera 24 includes a camera affixed inside of the vehicle 12, for example, in a headliner of the vehicle 12, having a view through the windscreen. In another non-limiting example, the vehicle camera 24 includes a camera affixed outside of the vehicle 12, for example, on a roof of the vehicle 12, having a view of the environment 32 in front of the vehicle 12.

In another exemplary embodiment, the vehicle camera 24 is a surround view camera system including a plurality of cameras (also known as satellite cameras) arranged to provide a view of the environment 32 adjacent to all sides of the vehicle 12. In a non-limiting example, the vehicle camera 24 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the vehicle camera 24 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

Figure 6A:
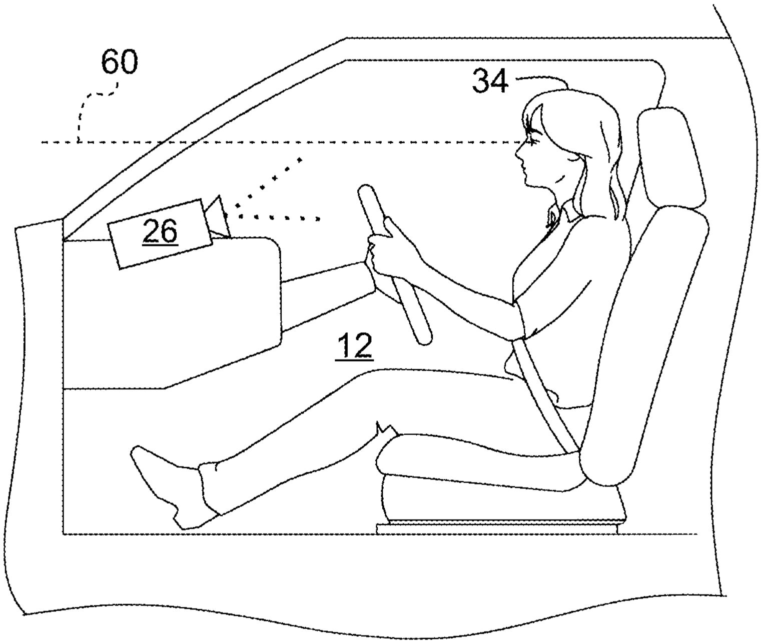
FIG. 6A is a diagram of a projected gaze of the occupant, according to a first exemplary embodiment.
Figure 6B:
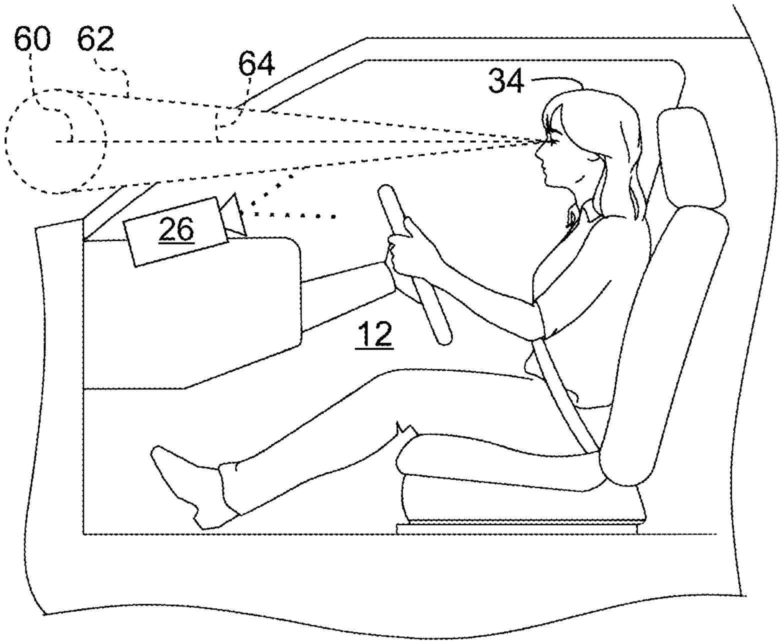
FIG. 6B is a diagram of a projected gaze of the occupant, according to a second exemplary embodiment.

The occupant monitoring system (OMS) 26 is used to determine a gaze direction of the vehicle occupant 34 (FIGS. 6A, 6B) within the vehicle 12. In the scope of the present disclosure, the occupant 34 (FIGS. 6A, 6B) includes a driver and/or a passenger of the vehicle 12. In an exemplary embodiment, the OMS 26 includes one or more infrared (IR) cameras positioned within the interior of the vehicle 12 to capture images of the vehicle occupant 34 (FIGS. 6A, 6B). The OMS further includes an image processor (not shown) in electrical communication with the IR cameras. The IR cameras capture high-resolution images of the face and eyes of the occupant 34 (FIGS. 6A, 6B) and the image processor analyzes the images to determine the gaze direction of the occupant 34 (FIGS. 6A, 6B). The OMS 26 utilizes reflected IR light from the eyes and surrounding facial features to track the orientation and position of the eyes, allowing the OMS 26 to calculate the gaze direction based on the processed image data. In a non-limiting example, the gaze direction of the occupant 34 (FIGS. 6A, 6B) is defined by a gaze vector. The OMS 26 is in electrical communication with the vehicle controller 14 as discussed above.

The GNSS 28 is used to determine a geographical location of the vehicle 12. In an exemplary embodiment, the GNSS 28 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna.

In an exemplary embodiment, the GNSS 28 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 28. It should be understood that various additional types of satellite-based radionavigation systems, such as, for example, the Global Positioning System (GPS), Galileo, GLONASS, and the BeiDou Navigation Satellite System (BDS) are within the scope of the present disclosure. The GNSS 28 is in electrical communication with the vehicle controller 14 as discussed above.

The IMU 30 is used to determine an orientation, velocity, and gravitational forces acting upon the vehicle 12. In an exemplary embodiment, the IMU 30 includes several sensors, including accelerometers, gyroscopes, and/or magnetometers. In a non-limiting example, the IMU 30 includes three-axis accelerometers and three-axis gyroscopes, which are integrated into a single unit. The accelerometers measure linear acceleration along each axis, while the gyroscopes measure angular velocity about each axis. The IMU 30 processes data from the sensors to calculate the current orientation, speed, heading, yaw rate (i.e., rate of change of heading), and acceleration of the vehicle 12 in three-dimensional space. The IMU 30 is in electrical communication with the vehicle controller 14, as discussed above.

The display 18 is used to provide information to the occupant 34 (FIGS. 6A, 6B) of the vehicle 12. In an exemplary embodiment, the display 18 is a human-machine interface (HMI) located in view of the occupant 34 (FIGS. 6A, 6B) and capable of displaying text, graphics and/or images. It is to be understood that HMI display systems including LCD displays, LED displays, and the like are within the scope of the present disclosure. Further exemplary embodiments where the display 18 is disposed in a rearview mirror are also within the scope of the present disclosure.

In another exemplary embodiment, the display 18 includes a head-up display (HUD) configured to provide information to the occupant 34 (FIGS. 6A, 6B) by projecting text, graphics, and/or images upon the windscreen of the vehicle 12. The text, graphics, and/or images are reflected by the windscreen of the vehicle 12 and are visible to the occupant 34 (FIGS. 6A, 6B) without looking away from a roadway ahead of the vehicle 12. In another exemplary embodiment, the display 18 includes an augmented reality (AR) display system such as an augmented reality head-up display (AR-HUD). The AR-HUD is a type of HUD configured to augment vision of the environment 32 surrounding the vehicle 12 for the occupant 34 (FIGS. 6A, 6B) by overlaying text, graphics, and/or images on physical objects in the environment 32 surrounding the vehicle 12 within a field-of-view of the occupant 34 (FIGS. 6A, 6B).

In an exemplary embodiment, the occupant 34 (FIGS. 6A, 6B) may interact with the display 18 using a human-interface device (HID), including, for example, a touchscreen, an electromechanical switch, a capacitive switch, a rotary knob, and the like. It should be understood that additional systems for displaying information to the occupant 34 (FIGS. 6A, 6B) of the vehicle 12 are also within the scope of the present disclosure. The display 18 is in electrical communication with the vehicle controller 14, as discussed above.

Figure 2:
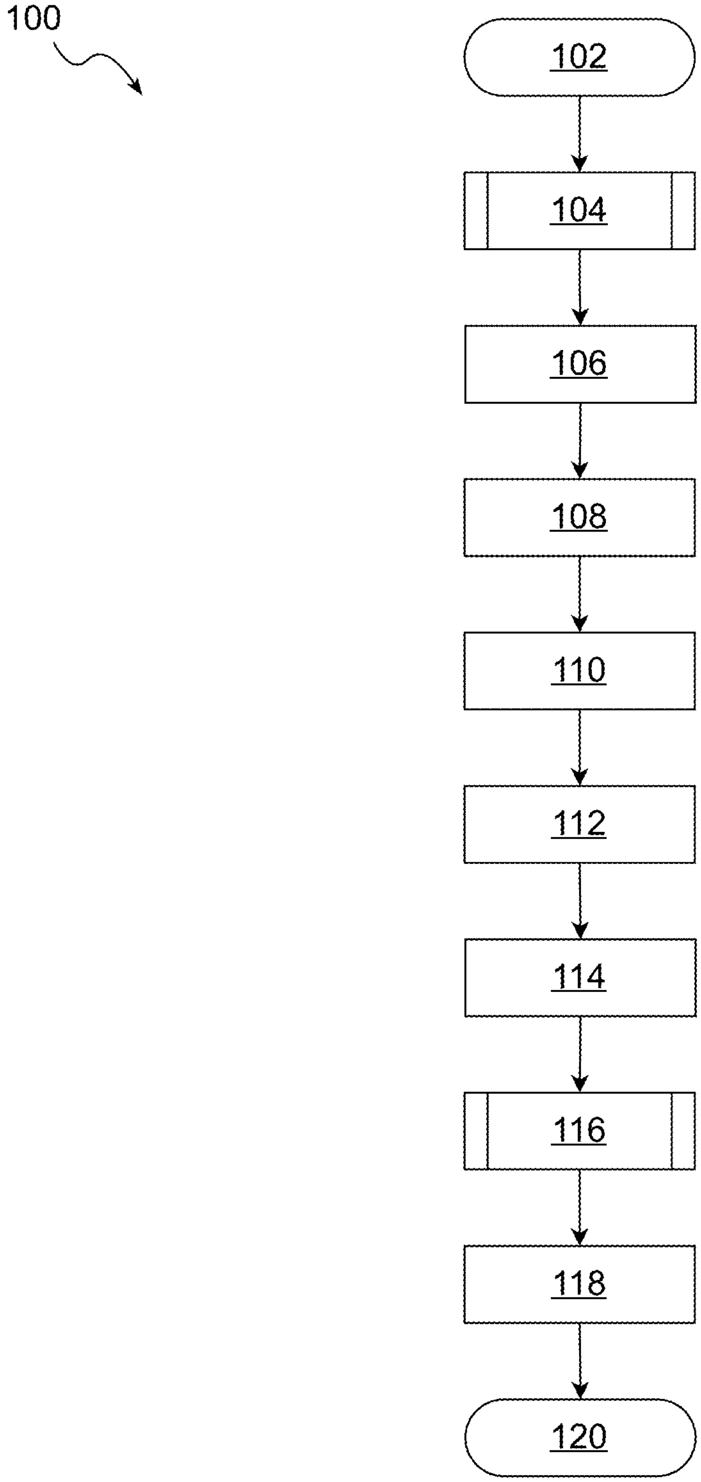
FIG. 2 is a flowchart of a method for displaying information to an occupant of a vehicle, according to an exemplary embodiment.
Figure 3A:
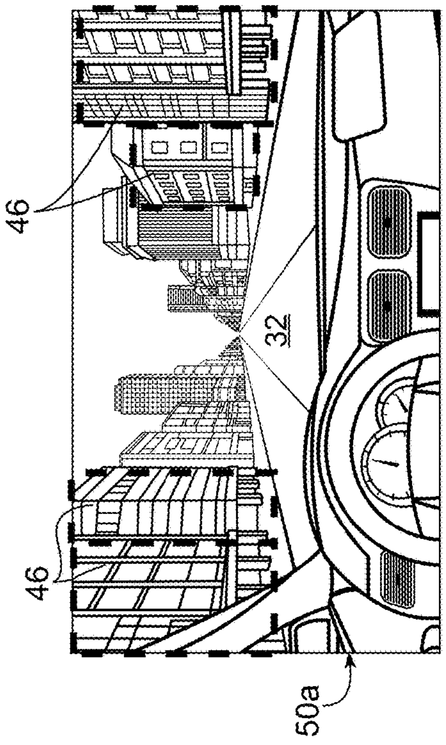
FIG. 3A is an illustration of an exemplary camera image captured by the vehicle, according to an exemplary embodiment.

Referring to FIG. 2, a flowchart of the method 100 for displaying information to an occupant of a vehicle is provided. The method 100 begins at block 102 and proceeds to block 104. At block 104, a three-dimensional (3D) map 40 (FIG. 3C) of the environment 32 is generated. In an exemplary embodiment, the 3D map 40 (FIG. 3C) includes a plurality of 3D points 42 (FIG. 3C) within a plurality of 3D bounding boxes 44 (FIG. 3C). Each of the plurality of 3D points 42 (FIG. 3C) is defined by a 3D point feature vector and a location in 3D space. In the scope of the present disclosure, a 3D point feature vector is a high-dimensionality vector (i.e., a 128-dimension vector) which uniquely identifies one of the plurality of 3D points 42 (FIG. 3C). In a non-limiting example, 3D point vectors are calculated using a mathematical algorithm based on characteristics of the subject 3D point and surrounding 3D points.

The plurality of 3D bounding boxes 44 (FIG. 3C) define locations of landmarks 46 (FIG. 3A) in three-dimensional space. In the scope of the present disclosure, a landmark is a point of interest (POI) such as, for example, a business, a school, a bus stop, a gas station, a government building (e.g., a police station, a fire station, a city hall), a hospital, a park, and/or the like. Each of the plurality of 3D bounding boxes 44 (FIG. 3C) corresponds to one of a plurality of landmarks 46 (FIG. 3A) in the environment 32. In an exemplary embodiment, the 3D map 40 (FIG. 3C) is generated using an external server system (not shown) located in a centralized location (e.g., a server farm, data center, or the like) and connected to the internet. Generation of the 3D map 40 (FIG. 3C) will be discussed in greater detail below. After block 104, the method 100 proceeds to block 106.

At block 106, the vehicle controller 14 uses the vehicle camera 24 to capture one or more camera images of the environment 32 surrounding the vehicle 12. Referring to FIG. 3A, an exemplary image 50*a* of the environment 32 captured at block 106 is shown. Referring again to FIG. 2, after block 106, the method 100 proceeds to block 108.

Referring again to FIG. 3A and with continued reference to FIG. 2, at block 108, the vehicle controller 14 detects one or more landmarks 46 in the one or more images of the environment 32 surrounding the vehicle 12 captured at block 106 (e.g., the exemplary image 50*a*). In the scope of the present disclosure, the one or more landmarks 46 detected at block 108 are referred to as one or more detected landmarks 46. In an exemplary embodiment, to detect the one or more detected landmarks 46, the vehicle controller 14 uses a computer vision algorithm. The computer vision algorithm utilizes machine learning techniques to analyze pixel-level information of an input image to detect and classify objects or patterns of interest. In a non-limiting example, the computer vision algorithm begins by preprocessing the input image through techniques such as, for example, image resizing, normalization, and/or filtering to reduce noise. Subsequently, the computer vision algorithm extracts relevant features from the input image using methods such as, for example, edge detection, corner detection, texture analysis, and/or the like. The computer vision algorithm may then utilize a machine learning model, such as, for example, a convolutional neural network (CNN), to classify and label relevant objects (i.e., the landmarks 46) of the input image based on learned patterns and associations.

Figure 3B:
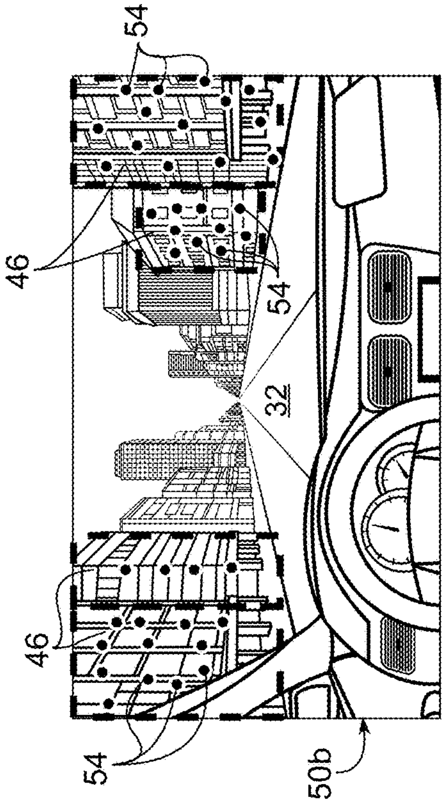
FIG. 3B is an illustration of an exemplary processed image, according to an exemplary embodiment.
Figure 3C:
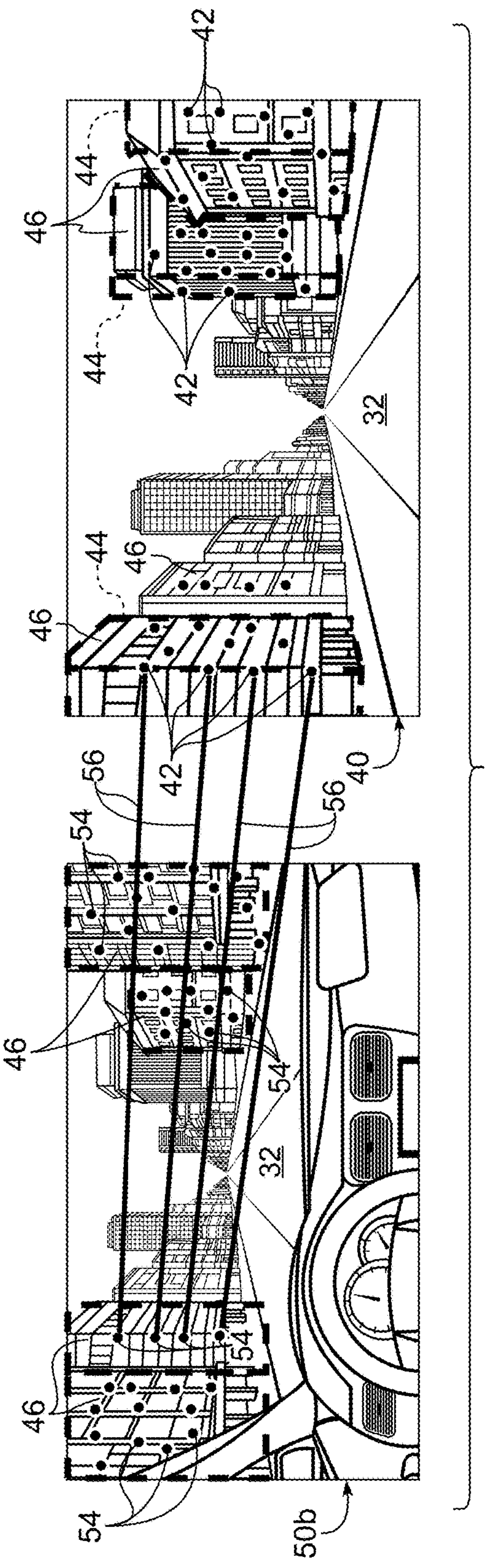
FIG. 3C is a diagram illustrating correspondence between the exemplary processed image of FIG. 3B and a 3D map, according to an exemplary embodiment.

Referring to FIG. 3B, an exemplary processed image 50*b* is shown. With reference to FIG. 2 and FIG. 3B, at block 108, the vehicle controller 14 further identifies a plurality of two-dimensional (2D) points 54 within each of the one or more detected landmarks 46. In the exemplary processed image 50 *b*, the plurality of 2D points 54 are visualized as black dots, but it should be understood that the plurality of 2D points 54 are arbitrary points of reference selected within each of the plurality of landmarks 46. The quantity, density, location, distribution, and/or the like of the plurality of 2D points 54 may vary within the scope of the present disclosure. In an exemplary embodiment, each of the plurality of 2D points 54 is defined by a 2D point feature vector and a location in 2D space. In the scope of the present disclosure, a 2D point feature vector is a high-dimensionality vector (i.e., a 128-dimension vector) which uniquely identifies one of the plurality of 2D points 54. In a non-limiting example, 2D point vectors are calculated using a mathematical algorithm based on characteristics of the subject 2D point and surrounding 2D points. After block 108, the method 100 proceeds to block 110.

Referring to FIG. 3C, a diagram illustrating correspondence between the exemplary processed image 50 *b* and the 3D map 40 is shown. With reference to FIG. 2 and FIG. 3C, at block 110, the vehicle controller 14 identifies a plurality of corresponding points between one or more of the plurality of 3D points 42 in the 3D map 40 and one or more of the plurality of 2D points 54 in the one or more images captured at block 106 (e.g., as illustrated in the exemplary processed image 50*b*). In the scope of the present disclosure, corresponding points are points which indicate a same physical location in the environment 32. In the example shown in FIG. 3C, the correspondence between the corresponding points is illustrated by the solid lines 56. It should be understood that while four corresponding points are illustrated in FIG. 3C, any number of corresponding points may be identified.

In an exemplary embodiment, the plurality of corresponding points are identified based at least in part on the 2D point feature vector of each of the plurality of 2D points 54 and the 3D point feature vector of each of the plurality of 3D points 42. In a non-limiting example, the vehicle controller 14 searches the 3D map 40 to find 3D points 42 having 3D point feature vectors substantially corresponding to (i.e. matching) one or more of the 2D point feature vectors of the 2D points 54 in the one or more images captured at block 106 (e.g., the exemplary processed image 50*b*). In an exemplary embodiment, the 3D map is only searched within the plurality of 3D bounding boxes 44 to increase the speed and accuracy of the search. Therefore, each of the plurality of corresponding points is located within one of the plurality of 3D bounding boxes 44. Referring again to FIG. 2, after block 110, the method 100 proceeds to block 112.

At block 112, the vehicle controller 14 determines a pose of the vehicle camera 24 defined with six degrees of freedom (DoF) based at least on the plurality of corresponding points determined at block 110. In the scope of the present disclosure, the six DoF are forward/backward (surge), up/down (heave), left/right (sway), yaw (rotation about normal axis), pitch (rotation about transverse axis), and roll (rotation about longitudinal axis). In an exemplary embodiment, the pose of the vehicle camera 24 is determined using a perspective-n-point (PnP) algorithm and/or a random sample consensus (RANSAC) algorithm as described in, for example, "Image Based 6-DOF Camera Pose Estimation with Weighted RANSAC 3D." by Wetzel, Johannes. (Lecture Notes in Computer Science, vol. 8142, pp. 249-254, September 2013), the entire contents of which is hereby incorporated by reference. In a non-limiting example, measurements from the GNSS 28 and/or the IMU 30 are also used for determining the six DoF, for example, for determining the surge, heave, and/or sway. After block 112, the method 100 proceeds to block 114.

At block 114, the vehicle controller 14 determines the gaze vector of the occupant 34 (FIGS. 6A, 6B). In an exemplary embodiment, to determine the gaze vector, the vehicle controller 14 uses the OMS 26 to perform measurements of the occupant 34 (FIGS. 6A, 6B) and determines the gaze vector. In a non-limiting example, the gaze vector is defined by a three-dimensional vector and a gaze origin point located at the eyes of the occupant 34 (FIGS. 6A, 6B). In an exemplary embodiment, the vehicle controller 14 determines the gaze vector using, for example, techniques discussed in "MPIIGaze: Real-world dataset and deep appearance-based gaze estimation" by Zhang, X., et al. (IEEE Transactions on Pattern Analysis and Machine Intelligence, vol. 41, no. 1, pp. 162-175, January 2019), the entire contents of which is hereby incorporated by reference. After block 114, the method 100 proceeds to block 116.

At block 116, the vehicle controller 14 determines a selected landmark of the plurality of landmarks 46 based at least in part on the plurality of 3D bounding boxes 44 in the 3D map 40, the pose of the vehicle camera 24 within the environment 32 mapped by the 3D map 40, and the gaze vector of the occupant 34 (FIGS. 6A, 6B). Determination of the selected landmark will be discussed in greater detail below. After block 116, the method 100 proceeds to block 118.

At block 118, the vehicle controller 14 uses the display 18 to display information about the selected landmark determined at block 116 to the occupant 34 (FIGS. 6A, 6B). In an exemplary embodiment, the information includes a name of the landmark (e.g., a business name), a logo of the landmark (e.g., a business logo), opening hours of the landmark, services available at the landmark (e.g., services offered by a business at the landmark), information about events occurring at the landmark, historical information about the landmark, news or current events related to the landmark, and/or the like. It should be understood that the information may include any type of information related to the landmark and that the information may be provided in any form, including text and/or graphics. In an exemplary embodiment, the vehicle controller 14 uses the AR display system of the display 18 to visually display the information. In another exemplary embodiment, the vehicle controller 14 uses text-to-speech or voice synthesis to audibly provide the information to the occupant 34 (FIGS. 6A, 6B). After block 118, the method 100 proceeds to enter a standby state at block 120.

In an exemplary embodiment, the vehicle controller 14 repeatedly exits the standby state 120 and restarts the method 100 at block 102. In a non-limiting example, the vehicle controller 14 exits the standby state 120 and restarts the method 100 on a timer, for example, every three hundred milliseconds.

Figure 4A:
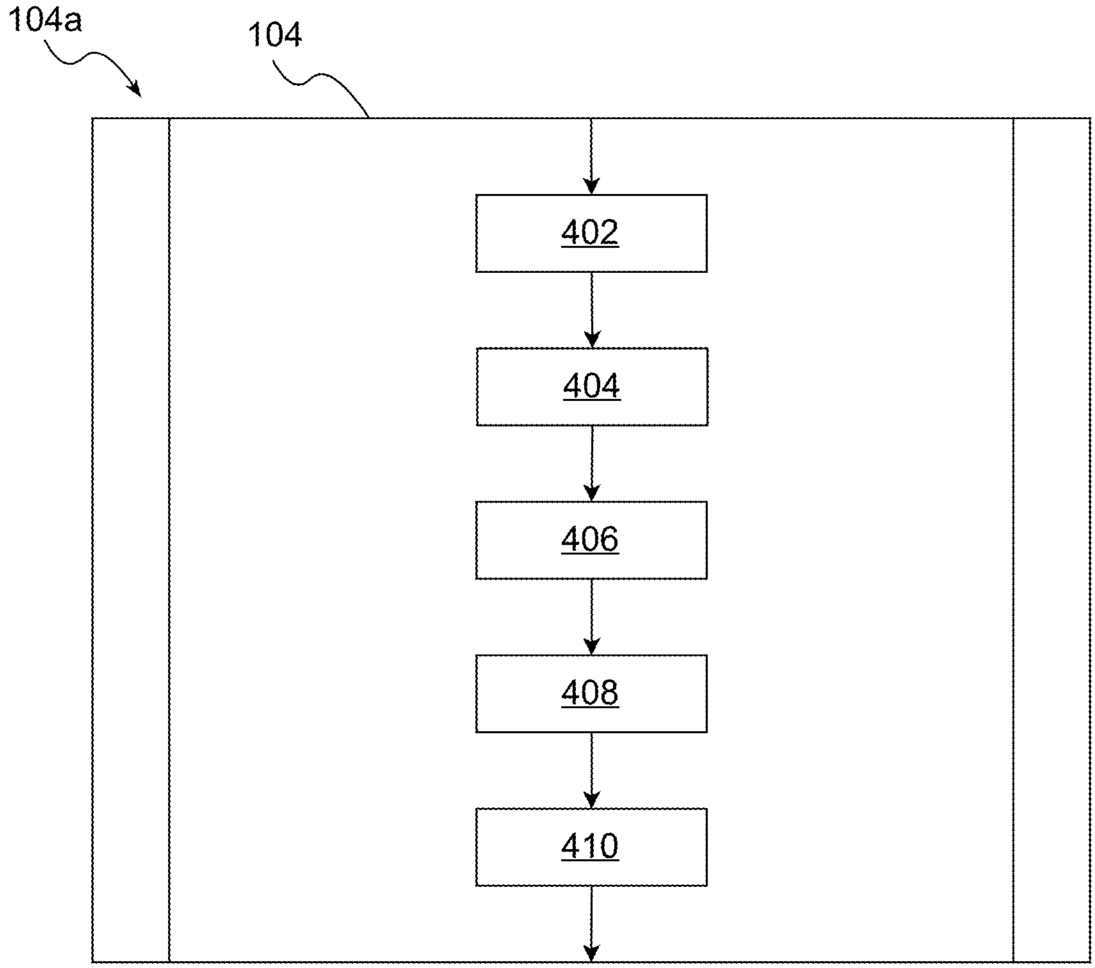
FIG. 4A is a flowchart of a method for generating the 3D map of FIG. 3C, according to an exemplary embodiment.

Referring to FIG. 4A, a flowchart of a method 104*a* for generating the 3D map 40 at block 104 of the method 100 is shown. In an exemplary embodiment, the method 104*a* is performed by the external server system (not shown), as discussed above. Referring to FIG. 4A and with continued reference to the preceding figures, the method 104*a* begins at block 402. At block 402, the external server system receives a plurality of reference images including the plurality of landmarks 46 in the environment 32. In an exemplary embodiment, the plurality of reference images are crowdsourced from multiple vehicles such as end-user vehicles, fleet vehicles, and/or dedicated data gathering vehicles. In a non-limiting example, the plurality of reference images are captured from varying locations in the environment 32, for example, as the multiple vehicles drive through the environment 32, thus capturing the plurality of landmarks 46 from varying angles/perspectives. After block 402, the method 104*a* proceeds to block 404.

Figure 4B:
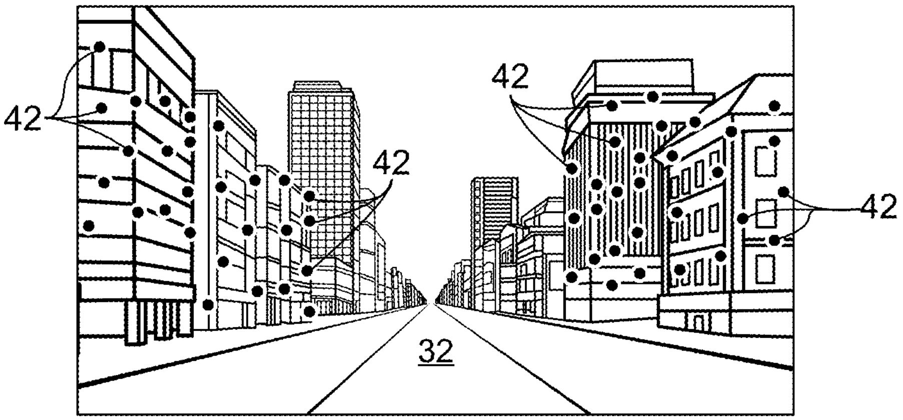
FIG. 4B is an illustration of an exemplary 3D point cloud overlayed on an illustration of the environment, according to an exemplary embodiment.

Referring to FIG. 4B, an illustration of an exemplary 3D point cloud overlayed on an illustration of the environment 32 is shown. Referring to FIG. 4A and FIG. 4B, at block 404, the external server system generates a 3D point cloud including the plurality of 3D points 42. In an exemplary embodiment, each of the plurality of 3D points 42 is defined by a 3D point vector and a location in 3D space. In the scope of the present disclosure, a 3D point feature vector is a vector (i.e., a one-dimensional matrix) which uniquely identifies one of the plurality of 3D points 42. In a non-limiting example, 3D point vectors are calculated using a mathematical algorithm based on characteristics of the subject 3D point and surrounding 3D points. In a non-limiting example, the 3D point vectors are calculated by averaging information from each of the plurality of reference images. In an exemplary embodiment, the 3D point cloud is generated based on the plurality of reference images gathered at block 402. In a non-limiting example, a structure from motion (SfM) algorithm is used to generate the 3D point cloud based on the plurality of reference images, as discussed in, for example, "A survey of structure from motion" by Özyeşil, O., et al. (Acta Numerica, vol. 26, pp. 305-364, May 2017), the entire contents of which is hereby incorporated by reference.

After generating the 3D point cloud including the plurality of 3D points 42, each of the plurality of 3D points 42 is labeled with a corresponding landmark of the plurality of landmarks 46. In a non-limiting example, each of the plurality of 3D points 42 is labeled with a geographically closest landmark as identified based on a map database including coordinate locations of each of the plurality of landmarks 46. In another non-limiting example, each of the plurality of 3D points 42 is labeled using computer vision based object detection on the plurality of reference images to identify the plurality of landmarks 46. Referring again to FIG. 4A, after block 404, the method 104*a* proceeds to block 406.

At block 406, a plurality of point cloud clusters are generated from the plurality of 3D points 42. In an exemplary embodiment, the plurality of point cloud clusters are generated using a density-based spatial clustering of applications with noise (DBSCAN) algorithm, as described in, for example, "A Density-Based Algorithm for Discovering Clusters in Large Spatial Databases with Noise" by Ester et al. (Proceedings of the Second International Conference on Knowledge Discovery and Data Mining, Pgs. 226-231, August 1996), the entire contents of which is hereby incorporated by reference. It should be understood that alternative or additional clustering algorithms, such as, for example, distributed DBSCAN (DDBSCAN), k-means, agglomerative clustering, mean shift, Gaussian mixture models, spectral clustering, affinity propagation, balanced iterative reducing and clustering using hierarchies (BIRCH), ordering points to identify the clustering structure (OPTICS), fuzzy c-means, and/or the like may be used without departing from the scope of the present disclosure. After block 406, the method 104*a* proceeds to block 408.

At block 408, the plurality of point cloud clusters are filtered to generate a plurality of filtered point cloud clusters. Each of the plurality of filtered point cloud clusters corresponds to one of the plurality of landmarks 46. In an exemplary embodiment, to filter the plurality of point cloud clusters, extraneous points are first removed. For example, points not associated with any of the plurality of landmarks 46 are disregarded.

Then, one or more of the plurality of point cloud clusters is split to generate a plurality of split point cloud clusters such that each of the plurality of split point cloud clusters contains points labeled with only one of the plurality of landmarks 46 (i.e., in a given split point cloud cluster, all points are labeled with the same landmark). In a non-limiting example, to split the plurality of point cloud clusters, for each of the plurality of point cloud clusters, if the point cloud cluster contains points labeled with different landmarks, the point cloud cluster is split into two or more split point cloud clusters each having points labeled with the same landmark.

Subsequently, in a non-limiting example, two or more of the plurality of split point cloud clusters are labeled alike to generate the plurality of filtered point cloud clusters. In a non-limiting example, the plurality of split point cloud clusters may include multiple split point cloud clusters corresponding to a single landmark 46 (e.g., a first split point cloud cluster corresponding to a sign, a parking lot, an entryway, and/or the like, and a second split point cloud cluster corresponding to a building housing the landmark itself). In an exemplary embodiment, the multiple split point cloud clusters are determined to correspond to a same one of the plurality of landmarks based at least in part on at least one of: a relative size of the two or more of the plurality of split point cloud clusters and a distance between the two or more of the plurality of split point cloud clusters. In a non-limiting example, the one or more of the plurality of split point cloud clusters are labeled alike with a nearest larger split point cloud cluster (i.e., containing more points covering a larger area) corresponding to a nearest landmark within a predetermined threshold distance. After block 408, the method 104*a* proceeds to block 410.

At block 410, the plurality of 3D bounding boxes 44 are determined based on the plurality of filtered point cloud clusters. In an exemplary embodiment, the bounds of each of the plurality of 3D bounding boxes 44 are determined such as to fully encompass one of the plurality of filtered point cloud clusters. Therefore, each of the plurality of 3D bounding boxes 44 corresponds to one of the plurality of landmarks 46. The plurality of 3D bounding boxes 44 are illustrated in the 3D map 40 shown in FIG. 3C as discussed above. In an exemplary embodiment, the completed 3D map 40 is transmitted to the vehicle 12 and stored in the media 22 of the vehicle controller 14 for use in the method 100 as discussed above. After block 410, the method 104*a* is concluded and the method 100 proceeds as discussed above.

Figure 5:
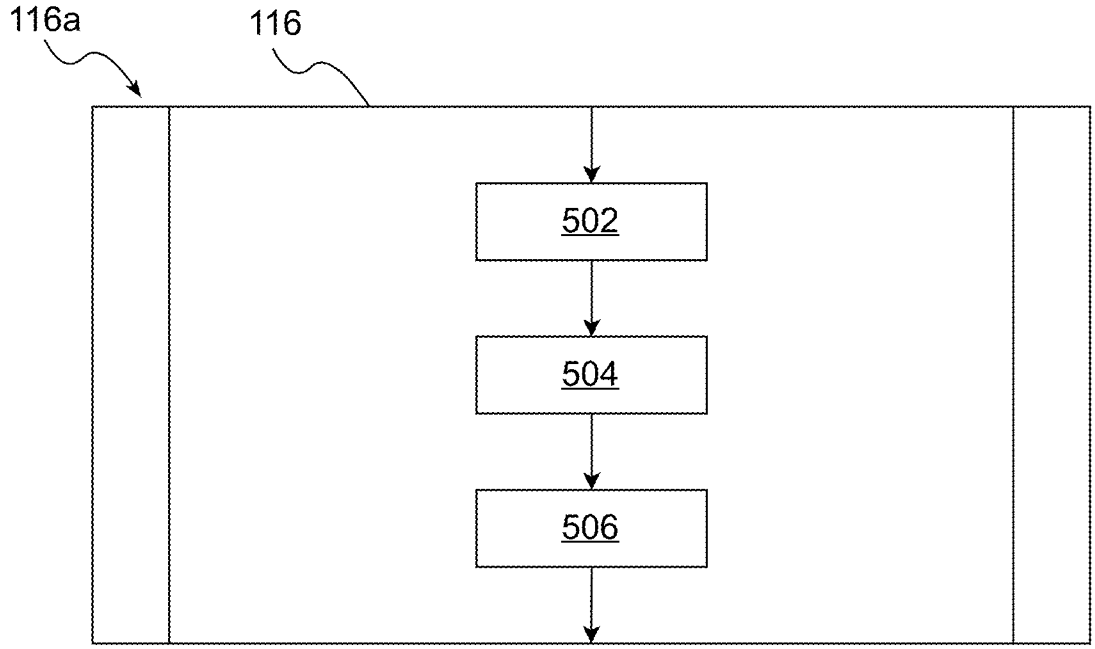
FIG. 5 is a flowchart of a method for determining a selected landmark, according to a first exemplary embodiment.

Referring to FIG. 5, a flowchart of a first exemplary embodiment 116*a* of block 116 of the method 100 (i.e., a method for determining a selected landmark) is shown. The first exemplary embodiment 116*a* of block 116 begins at block 502. At block 502, the vehicle controller 14 determines a projected gaze based on the gaze vector determined at block 114. In the scope of the present disclosure, the projected gaze is a projection (i.e., coordinate transformation) of the gaze vector into a coordinate system of the environment 32 (i.e., a world coordinate system) and the 3D map 40. In an exemplary embodiment, the gaze vector is transformed based on the pose of the vehicle camera 24 determined at block 112. In a non-limiting example, the OMS 26 determines the gaze vector in a relative coordinate system of the vehicle 12 and the pose of the vehicle camera 24 anchors the relative coordinate system of the vehicle 12 within an absolute coordinate system of the environment 32 (i.e., a world coordinate system). Therefore, the projected gaze is determined using one or more coordinate transformations and projected into the 3D map 40.

Referring to FIG. 6A, a diagram of a first exemplary embodiment of the projected gaze with the occupant 34 in the vehicle 12 is shown. In FIG. 6A, the projected gaze is realized as a projected gaze vector 60. The projected gaze vector 60 is analogous to the gaze vector discussed above, except that the projected gaze vector 60 is defined in a same coordinate system as the 3D map 40 (i.e., a world coordinate system).

Referring to FIG. 6B, a diagram of a second exemplary embodiment of the projected gaze with the occupant 34 in the vehicle 12 is shown. In FIG. 6B, the projected gaze is realized as a projected gaze cone 62 in addition to the projected gaze vector 60. The projected gaze cone 62 is defined by a gaze cone angle 64. A longitudinal axis of the projected gaze cone is coincident with the projected gaze vector 60 as shown in FIG. 6B. In an exemplary embodiment, the gaze cone angle 64 may be predetermined or adjustable, as will be discussed in greater detail below. Referring again to FIG. 5, after block 502, the first exemplary embodiment 116*a* of block 116 proceeds to block 504.

At block 504, the vehicle controller 14 identifies one or more collisions between the projected gaze determined at block 502 and one or more of the plurality of 3D bounding boxes 44. In an exemplary embodiment, axis-aligned bounding box (AABB) collision detection is used to identify collisions as is known in the art of computer graphics. In a non-limiting example, the projected gaze is further projected or simulated within the 3D map 40 and collisions with the plurality of 3D bounding boxes 44 are identified. In an exemplary embodiment, the embodiment shown in FIG. 6B including the gaze cone 62 may be used to increase the reliability and repeatability of the collision detection. By adjusting the gaze cone angle 64, an effective sensitivity of the gaze collision detection may be tuned. In an exemplary embodiment, if the gaze cone 62 does not collide with any of the plurality of 3D bounding boxes 44, the gaze cone angle 64 is incrementally increased until a collision with a nearest bounding box is identified. After block 504, the first exemplary embodiment 116*a* of block 116 proceeds to block 506.

At block 506, the vehicle controller 14 identifies the selected landmark of the plurality of landmarks 46. In an exemplary embodiment, the selected landmark identified based at least in part on the one or more collisions identified at block 504. In a non-limiting example, if the projected gaze collides with a first of the plurality of 3D bounding boxes 44, the selected landmark is determined to be the one of the plurality of landmarks 46 corresponding to the first of the plurality of 3D bounding boxes 44. If the gaze cone 62 collides with multiple bounding boxes, a collision closest to the center of the gaze cone 62 (i.e., a location of the projected gaze vector 60) is determined to be the selected landmark. After block 506, the first exemplary embodiment 116*a* of block 116 is concluded, and the method 100 proceeds as discussed above.

Figure 7:
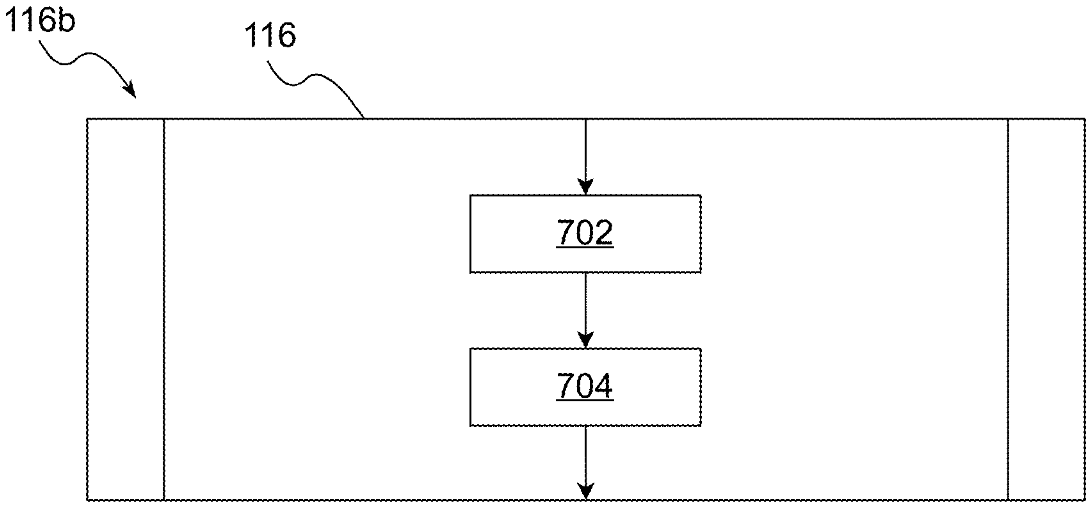
FIG. 7 is a flowchart of a method for determining a selected landmark, according to a second exemplary embodiment.
Figure 8:
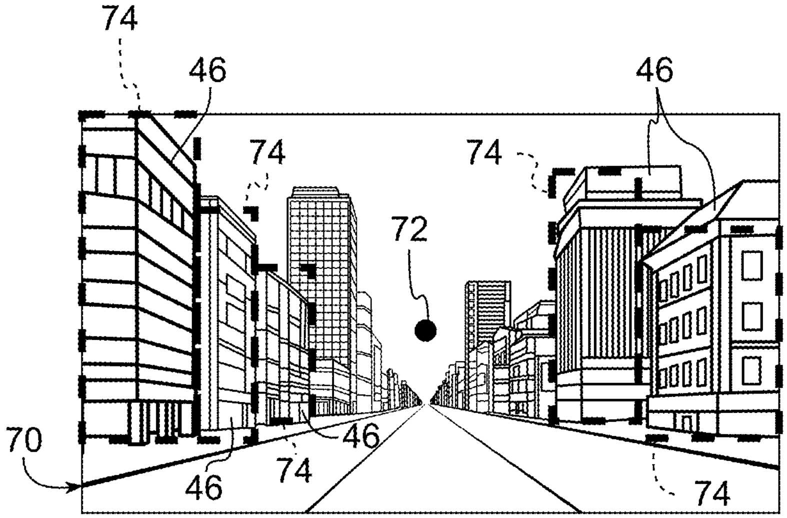
FIG. 8 is an illustration of an exemplary view frustum of the occupant, according to an exemplary embodiment.

Referring to FIG. 7, a flowchart of a second exemplary embodiment 116*b* of block 116 of the method 100 (i.e., a method for determining a selected landmark) is shown. The second exemplary embodiment 116*b* of block 116 begins at block 702. Referring to FIG. 8, an exemplary view frustum 70 is shown. Referring to FIG. 7 and FIG. 8, at block 702, the vehicle controller 14 determines a view frustum 70 of the occupant 34 based at least in part on the gaze vector of the occupant 34, the pose of the vehicle camera 24, and the 3D map 40 including the plurality of 3D bounding boxes 44. In the scope of the present disclosure, the view frustum 70 is a 2D projection of a field of view of the occupant 34.

In an exemplary embodiment, the view frustum 70 is determined by first projecting the gaze vector into the 3D map 40, as discussed above. The perspective view of the occupant 34 within the 3D map 40 is then determined based on the projection of the gaze vector and an estimated or preset field of view of the occupant 34 centered on the projection of the gaze vector within the 3D map 40. Subsequently, the perspective view of the occupant 34 is projected to 2D to create the view frustum 70. In a non-limiting example, the view frustum 70 includes a 2D gaze vector 72 (i.e., a 2D projection of the gaze vector) and a plurality of 2D bounding boxes 74 (i.e., a 2D projection of the plurality of 3D bounding boxes 44). In a non-limiting example, the view frustum 70 is centered on the 2D gaze vector 72. Referring again to FIG. 7, after block 702, the second exemplary embodiment 116*b* of block 116 proceeds to block 704.

At block 704, the vehicle controller 14 determines the selected landmark of the plurality of landmarks 46. In an exemplary embodiment, the vehicle controller 14 identifies the selected landmark using the view frustum 70. In a first exemplary embodiment, the selected landmark is determined based at least in part on a distance between the 2D gaze vector 72 and each of the plurality of 2D bounding boxes 74. In a non-limiting example, the selected landmark is determined to be one of the plurality of landmarks 46 in the view frustum 70 which has a 2D bounding box 74 which is geometrically closest to the 2D gaze vector 72. In a second exemplary embodiment, the selected landmark is determined based at least in part on an area of each of the plurality of 2D bounding boxes 74. In a non-limiting example, the selected landmark is determined to be one of the plurality of landmarks 46 in the view frustum 70 which has a 2D bounding box 74 having a largest area. In another non-limiting example, the selected landmark is determined to be one of the plurality of landmarks 46 in the view frustum 70 which has a 2D bounding box 74 having a largest area within a predetermined distance threshold of the 2D gaze vector 72. After block 704, the second exemplary embodiment 116*b* of block 116 is concluded, and the method 100 proceeds as discussed above.

The system 10 and method 100 of the present disclosure offer several advantages. By utilizing the system 10 and method 100, vehicle occupants are provided with relevant information about objects in their environment based on gaze detection. Furthermore, the system 10 and method 100 allows for the effective generation of detailed 3D maps which include locations of landmarks in the environment. By searching the 3D map data based on 2D image data captured by the vehicle 12, accurate and precise location and pose information about the vehicle camera 24 and by extension the vehicle 12 may be determined.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for displaying information to an occupant of a vehicle, the method comprising:

generating a three-dimensional (3D) map of an environment surrounding the vehicle, wherein the 3D map includes a plurality of 3D bounding boxes, and wherein each of the plurality of 3D bounding boxes corresponds to one of a plurality of landmarks, wherein generating the 3D map further comprises:

generating a 3D point cloud including a plurality of 3D points based on a plurality of reference images including the plurality of landmarks, wherein each of the plurality of 3D points is defined by a 3D point feature vector; and determining each of the plurality of 3D bounding boxes by clustering the 3D point cloud into a plurality of point cloud clusters;

determining a pose of a vehicle camera based at least in part on one or more camera images of an environment surrounding the vehicle captured using the vehicle camera, wherein determining the pose of the vehicle camera further comprises:

capturing the one or more camera images using the vehicle camera;

detecting one or more detected landmarks of the plurality of landmarks in the one or more camera images, wherein detecting the one or more detected landmarks further comprises:

identifying a plurality of 2D points within each of the one or more detected landmarks in the one or more camera images; and determining a 2D point feature vector for each of the plurality of 2D points; and identifying a plurality of corresponding points between one or more of the plurality of 3D points and one or more of the plurality of 2D points based at least in part on the 3D point feature vector of each of the plurality of 3D points and the 2D point feature vector of each of the plurality of 2D points, wherein each of the plurality of corresponding points is located within one of the plurality of 3D bounding boxes; and determining the pose of the vehicle camera using a perspective-n-point (PnP) algorithm and a random sample consensus (RANSAC) algorithm based at least in part on the plurality of corresponding points, wherein the pose of the vehicle camera is defined with six degrees of freedom (DoF);

determining a gaze vector of the occupant of the vehicle;

determining a selected landmark of the plurality of landmarks based at least in part on the plurality of 3D bounding boxes, the pose of the vehicle camera, and the gaze vector of the occupant; and displaying information about the selected landmark to the occupant using a display.

2. The method of claim 1, wherein clustering the 3D point cloud further comprises:

generating the plurality of point cloud clusters using a density-based spatial clustering of applications with noise (DBSCAN) algorithm; and filtering the plurality of point cloud clusters to generate a plurality of filtered point cloud clusters, wherein each of the plurality of filtered point cloud clusters corresponds to one of the plurality of landmarks.

3. The method of claim 2, wherein filtering the plurality of point cloud clusters further comprises:

splitting one or more of the plurality of point cloud clusters to generate a plurality of split point cloud clusters, wherein each of the plurality of split point cloud clusters corresponds to only one of the plurality of landmarks, wherein the plurality of filtered point cloud clusters includes the plurality of split point cloud clusters.

4. The method of claim 3, wherein filtering the plurality of point cloud clusters further comprises:

determining two or more of the plurality of split point cloud clusters to correspond to a same one of the plurality of landmarks based at least in part on at least one of: a relative size of the two or more of the plurality of split point cloud clusters and a distance between the two or more of the plurality of split point cloud clusters.

5. The method of claim 1, wherein determining the selected landmark further comprises:

determining a projected gaze based at least in part on the gaze vector of the occupant;

identifying one or more collisions between the projected gaze and one or more of the plurality of 3D bounding boxes; and determining the selected landmark based at least in part on the one or more collisions.

6. The method of claim 5, wherein determining the projected gaze and identifying the one or more collisions further comprises:

determining the projected gaze, wherein the projected gaze further includes a gaze cone defined by a gaze cone angle, and wherein a longitudinal axis of the gaze cone is coincident with the gaze vector; and identifying the one or more collisions between the gaze cone and one or more of the plurality of 3D bounding boxes.

7. The method of claim 1, wherein determining the selected landmark further comprises:

determining a view frustum of the occupant based at least in part on the gaze vector of the occupant, the pose of the vehicle camera, and the plurality of 3D bounding boxes, wherein the view frustum includes a 2D projection of the gaze vector and a 2D projection of the plurality of 3D bounding boxes; and determining the selected landmark based at least in part on a distance between the 2D projection of the gaze vector and the 2D projection of each of the plurality of 3D bounding boxes.

8. A system for displaying information to an occupant of a vehicle, the system comprising:

a vehicle camera;

an occupant monitoring system (OMS);

an augmented reality (AR) display system; and a vehicle controller in electrical communication with the vehicle camera, the OMS, and the AR display system, wherein the vehicle controller is programmed to:

capture one or more camera images of an environment surrounding the vehicle using the vehicle camera;

determine a pose of the vehicle camera based at least in part on the one or more camera images, wherein to determine the pose of the vehicle camera, the vehicle controller is further programmed to:

detect one or more detected landmarks of a plurality of landmarks in the one or more camera images, wherein to detect the one or more detected landmarks, the vehicle controller is further programmed to:

identify a plurality of 2D points within each of the one or more detected landmarks in the one or more camera images; and determine a 2D point feature vector for each of the plurality of 2D points; and identify a plurality of corresponding points between one or more of a plurality of 3D points and one or more of the plurality of 2D points based at least in part on a 3D point feature vector of each of the plurality of 3D points and the 2D point feature vector of each of the plurality of 2D points, wherein each of the plurality of corresponding points is located within one of a plurality of 3D bounding boxes; and determine the pose of the vehicle camera using a perspective-n-point (PnP) algorithm and a random sample consensus (RANSAC) algorithm based at least in part on the plurality of corresponding points, wherein the pose of the vehicle camera is defined with six degrees of freedom (DoF);

determine a gaze vector of the occupant of the vehicle using the OMS;

generate a three-dimensional (3D) map of an environment surrounding the vehicle, wherein the 3D map includes the plurality of 3D bounding boxes, and wherein each of the plurality of 3D bounding boxes corresponds to one of the plurality of landmarks, wherein to generate the 3D map, the vehicle controller is further programmed to:

generate a 3D point cloud including the plurality of 3D points based on a plurality of reference images including the plurality of landmarks, wherein each of the plurality of 3D points is defined by the 3D point feature vector; and determine each of the plurality of 3D bounding boxes by clustering the 3D point cloud into a plurality of point cloud clusters;

determine a selected landmark of the plurality of landmarks in the environment surrounding the vehicle based at least in part on the pose of the vehicle camera, the gaze vector of the occupant, and the 3D map; and display information about the selected landmark to the occupant using the AR display system.

9. The system of claim 8, wherein to determine the selected landmark, the vehicle controller is further programmed to:

determine a projected gaze based at least in part on the gaze vector of the occupant;

identify one or more collisions between the projected gaze and one or more of the plurality of 3D bounding boxes; and determine the selected landmark based at least in part on the one or more collisions.

10. The system of claim 9, wherein to determine the projected gaze and identify the one or more collisions, the vehicle controller is further programmed to:

determine the projected gaze, wherein the projected gaze further includes a gaze cone defined by a gaze cone angle, and wherein a longitudinal axis of the gaze cone is coincident with the gaze vector; and identify the one or more collisions between the gaze cone and one or more of the plurality of 3D bounding boxes.

11. The system of claim 8, wherein to determine the selected landmark, the vehicle controller is further programmed to:

determine a view frustum of the occupant based at least in part on the gaze vector of the occupant, the pose of the vehicle camera, and the plurality of 3D bounding boxes, wherein the view frustum includes a 2D projection of the gaze vector and a 2D projection of the plurality of 3D bounding boxes; and determine the selected landmark based at least in part on a distance between the 2D projection of the gaze vector and the 2D projection of each of the plurality of 3D bounding boxes.

12. The system of claim 8, wherein to determine the selected landmark, the vehicle controller is further programmed to:

determine a view frustum of the occupant based at least in part on the gaze vector of the occupant, the pose of the vehicle camera, and the plurality of 3D bounding boxes, wherein the view frustum includes a 2D projection of the gaze vector and a 2D projection of the plurality of 3D bounding boxes; and determine the selected landmark based at least in part on an area of the 2D projection of each of the plurality of 3D bounding boxes.

13. A method for displaying information to an occupant of a vehicle, the method comprising:

capturing one or more camera images using a vehicle camera;

detecting one or more detected landmarks of a plurality of landmarks in the one or more camera images;

generating a three-dimensional (3D) map of an environment surrounding the vehicle, wherein the 3D map includes a plurality of 3D bounding boxes, and wherein each of the plurality of 3D bounding boxes corresponds to one of a plurality of landmarks, wherein generating the 3D map further comprises:

generating a 3D point cloud including a plurality of 3D points based on a plurality of reference images including the plurality of landmarks, wherein each of the plurality of 3D points is defined by a 3D point feature vector; and determining each of the plurality of 3D bounding boxes by clustering the 3D point cloud into a plurality of point cloud clusters;

determining a pose of the vehicle camera based at least in part on one or more camera images of an environment surrounding the vehicle captured using the vehicle camera and the 3D map of the environment surrounding the vehicle, wherein determining the pose of the vehicle camera further comprises:

capturing the one or more camera images using the vehicle camera;

detecting one or more detected landmarks of the plurality of landmarks in the one or more camera images, wherein detecting the one or more detected landmarks further comprises:

identifying a plurality of 2D points within each of the one or more detected landmarks in the one or more camera images; and determining a 2D point feature vector for each of the plurality of 2D points; and identifying a plurality of corresponding points between one or more of the plurality of 3D points and one or more of the plurality of 2D points based at least in part on the 3D point feature vector of each of the plurality of 3D points and the 2D point feature vector of each of the plurality of 2D points, wherein each of the plurality of corresponding points is located within one of the plurality of 3D bounding boxes; and determining the pose of the vehicle camera using a perspective-n-point (PnP) algorithm and a random sample consensus (RANSAC) algorithm based at least in part on the plurality of corresponding points, wherein the pose of the vehicle camera is defined with six degrees of freedom (DoF);

determining a gaze vector of the occupant of the vehicle;

determining a selected landmark of the plurality of landmarks based at least in part on the 3D map, the pose of the vehicle camera, and the gaze vector of the occupant; and displaying information about the selected landmark to the occupant using an augmented reality (AR) display system.

14. The method of claim 13, wherein determining the selected landmark further comprises:

determining a projected gaze, wherein the projected gaze includes a gaze cone defined by a gaze cone angle, and wherein a longitudinal axis of the gaze cone is coincident with the gaze vector;

identifying one or more collisions between the gaze cone and one or more of a plurality of 3D bounding boxes of the 3D map, wherein each of the plurality of 3D bounding boxes corresponds to one of the plurality of landmarks; and determining the selected landmark based at least in part on the one or more collisions.

* * * * *